United States Patent [19]

Kobayashi

[11] 4,394,690

[45] Jul. 19, 1983

[54] VARIABLE ASPECT RATIO TELEVISION RECEIVER

[75] Inventor: Katsumi Kobayashi, Machida, Japan

[73] Assignee: Sony Corporation, Tokyo, Japan

[21] Appl. No.: 257,389

[22] Filed: Apr. 24, 1981

[30] Foreign Application Priority Data

Apr. 25, 1980 [JP] Japan .............................. 55-55871[U]

[51] Int. Cl.$^3$ ......................... H04N 3/22; H04N 5/74
[52] U.S. Cl. .................................. 358/180; 358/146; 358/237
[58] Field of Search ................. 358/180, 237, 22, 242, 358/87, 54, 147, 188, 21 R, 146, 142, 214–216; 315/395

[56] References Cited

U.S. PATENT DOCUMENTS 3,097,262  7/1963  Ehrenhaft ......................... 358/180
3,493,674  2/1970  Houghton ......................... 358/147
4,233,628  11/1980  Ciciora .............................. 358/180

Primary Examiner—John C. Martin
Attorney, Agent, or Firm—Lewis H. Eslinger; Alvin Sinderbrand

[57] ABSTRACT

A variable aspect ratio television receivier, which can receive a non-standard television signal containing an identification signal superimposed upon video signal for the first several horizontal scanning lines in the vertical scanning period. An AND gate is adapted to detect the aforementioned identification signal as such if the signal has a frequency within a range sufficiently higher than to the horizontal scanning frequency and lower than and sufficiently distinguishable from the color sub-carrier frequency, and has a sufficient level within a range conforming to the broadcasting standard continuously for a predetermined period in its predetermined section, and the output of the AND circuit is used to drive a deflection amplitude switch relay circuit for controlling the horizontal deflection amplitude of the image reproduction.

10 Claims, 5 Drawing Figures

VARIABLE ASPECT RATIO TELEVISION RECEIVER

BACKGROUND OF THE INVENTION

This invention relates to television receivers capable of varying the aspect ratio of the reproduced image and, more particularly, to television receivers with which the aspect ratio can be automatically switched.

While with the standard broadcast television signals the aspect ratio of the reproduction on the picture tube is set to 3:4, with closed television systems and video tape recorders for special household and other private purposes it is possible to freely select a desired aspect ratio independently of the standard system for non-standard television signals can be used in these systems; for instance it is possible to obtain a wide image compared to the standard system image by setting the aspect ratio to 1:2.

In this caes, an identification (ID) signal $S_I$ at a particular frequency may be superimposed on the sync chip portion of the sync signal $S_S$ of a non-standard television signal as shown in FIG. 2, and the television receiver side may be arranged such that the deflection circuit thereof may be automatically switched with detection of the ID signal. Designated at $S_B$ in FIG. 2 is the signal.

FIG. 1A shows the block diagram of the prior art television receiver in which the aspect ratio of the image reproduction on the picture tube can be automatically changed. With this construction, when receiving the standard broadcast television signal, the composite video signal derived from the television intercepted by the antenna and supplied to the input terminal 1, is coupled to a video signal amplifier 2 for amplifying the video signal in the input signal, the amplified video signal being coupled to a cathode-ray tube 3, while the input signal is also coupled through an identification signal elimination circuit 4 and a deflection circuit 5 to produce a deflection current flowing through a horizontal deflection yoke 8. In the deflection circuit 5, a sync separator, an oscillator, an output circuit, etc. are included. At this time, since the standard television signal contains no ID signal, it is coupled to the deflection circuit 5 without any change of the sync signal. Also, since the input signal is coupled through a band-pass filter 6 and an ID signal detection circuit 7, but since no ID signal is contained, the detected output is zero, and image reproduction with the ordinary aspect ratio of 3:4 is reproduced is obtained in the area labeled A of the cathode-ray tube 3. This image reproduction in the area A of the cathode-ray tube 3 in FIG. 1B is focused by a lens 9 onto a wide screen 10 in an area A' thereof as shown in FIG. 1C.

When receiving a non-standard television signal, which contains the ID signal $S_I$ inserted in the sync signal $S_S$, the ID signal is separated from the rest of the television signal by the band-pass amplifier 6 and rectified in a predetermined way by the ID signal detecting circuit 7, the output of which is supplied to the deflection circuit 5. The amplitude of the horizontal sawtooth wave of the output of the deflection circuit 5 is automatically controlled by the output of the ID signal detecting circuit 7, whereby a corresponding aspect ratio of the image reproduction on the cathode-ray tube 3 (for instance of 1:2) is obtained.

More particularly, an elongated image, for instance, is reproduced in the areas A, $B_1$ and $B_2$ is reproduced as shown in FIG. 1B, and its projection is focused on the screen 10 over the entire areas A', $B_1'$ and $B_2'$ as shown in FIG. 1C.

The areas $C_1$ and $C_2$ of the cathode-ray tube 3 are not used.

The signal which contains the ID signal $S_I$ superimposed upon the sync signal $S_S$, as used with the prior art system described above, can be used only in a closed system such as a VTR for private purpose and is not suitable for the standard systems prescribed by the broadcasting standards. In addition, it is impossible to provide sufficient amplitude or duration of the ID signal $S_I$ to ensure steady and reliable detection of this signal, and therefore mis-operation is prone.

Aside from the aforementioned ID signal, it has also been proposed to insert an ID signal in a fixed one horizontal scanning line period in the vertical blanking period like vertical interval reference signal and detect it. Such an ID signal, however, is restricted for use by the broadcasting standards. In addition, in the case of the ½-inch size VTR the aforementioned ID signal in the vertical blanking period cannot be accurately reproduced and is liable to be dropped out at the time of playback.

Further, it has been proposed to insert and detect a continuous wave at a frequency at the end of or outside the audible frequency range for the purpose of switching the aspect ratio. However, in the case of the household VTR, the frequency of this ID signal has to be set within the audible frequency range, thus leading to objectionable reproduction of sound.

SUMMARY OF THE INVENTION

The present invention is intended to resolve the various problems discussed above, and its object is to provide a television receiver, in which a continuous wave at a constant frequency and of a constant amplitude in the video signal period in first several horizontal scanning lines of the vertical scanning period unseen by the viewer, and this continuous signal is extracted in the aforementioned initial deflection stage of the vertical scanning period and processed in a processing circuit, the output of which is used to drive a relay circuit to control the current flowing in a horizontal deflection yoke so as to obtain automatic control of the aspect ratio of the image reproduced.

DESCRIPTION OF THE PREFERRED EMBODIMENTS

Figure 1A:
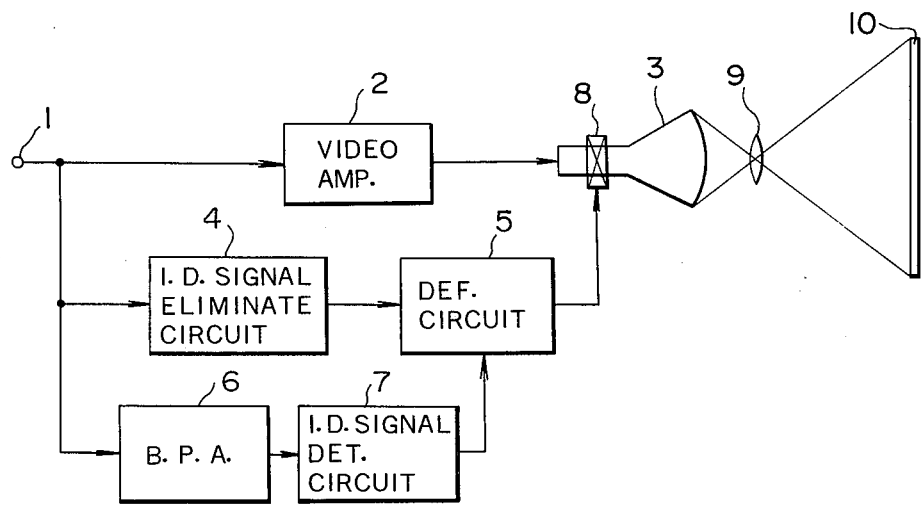
FIG. 1A is a block diagram showing a prior art television receiver.
Figure 1B:
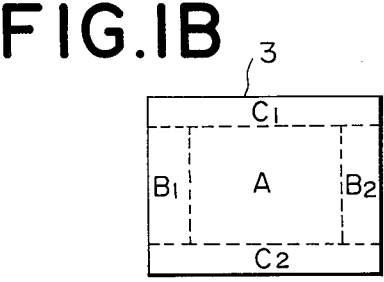
FIG. 1B is a view showing the aspect ratio of image reproduction on cathode-ray tube.
Figure 1C:
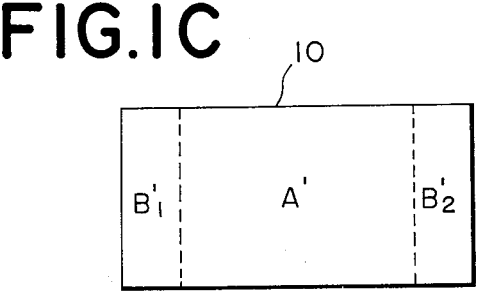
FIG. 1C is a view also showing the aspect ratio of image reproduction on cathode-ray tube.
Figure 2:
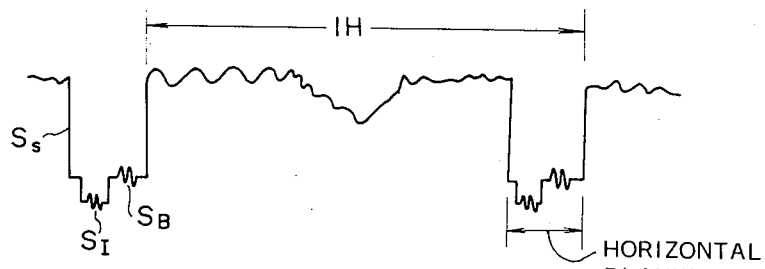
FIG. 2 is a waveform diagram showing a non-standard television signal.
Figure 3:
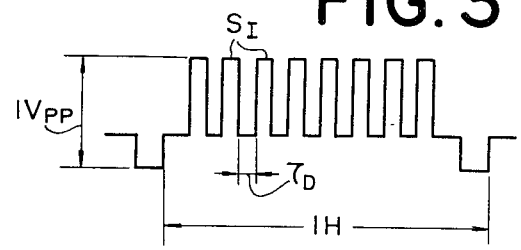
FIG. 3 is a waveform diagram showing a television signal containing an identification signal $S_I$ used for identifying the aspect ratio of image reproduction on cathode-ray the according to the present invention.

Now, the present invention will be described with reference to the accompanying drawings. FIG. 3 shows the waveform of a television signal, which contains an identification signal $S_I$ specifying the aspect ratio of the image reproduction according to the present invention. The identification signal $S_I$ here is inserted in the video signal portions of first several horizontal scanning lines of the vertical scanning period, and it is sufficiently large within a range conforming to the broadcasting standards (for instance 0.6 $V_{pp}$ in the case of a video signal of 1 $V_{pp}$) and sinusoidal or rectangular in waveform. Its frequency is selected to a value, which is not affected by the broadcasting apparatus and various VTR including household VTR and sufficiently high compared to the horizontal sync signal frequency to minimize the effects of the sync signal, for instance 1 MHz. Labeled $\tau_D$ is the half-cycle period of the ID signal $S_I$, which corresponds to the delay time of a relay circuit 15 to be described later.

Figure 4:
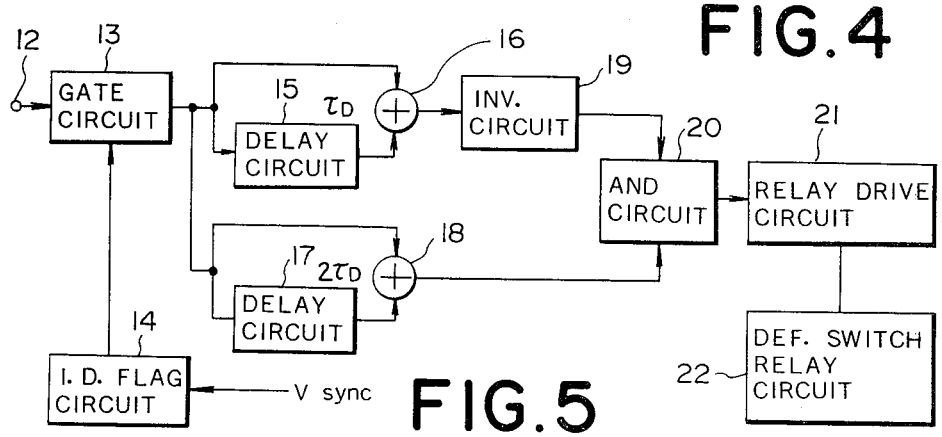
FIG. 4 is a block diagram showing a detecting circuit for detecting an identification signal $S_I$ provided in a television receiver according to the present invention.

FIG. 4 shows a circuit for detecting the identification signal, which is provided on the side of the television receiver. In the Figure, designated at 12 is a television signal input terminal which is connected to a gate circuit 13. To the gate circuit 13, an ID flag circuit 14 which is operated by the vertical sync signal as trigger signal and forms a flag pulse of an interval corresponding to several horizontal scanning periods after the blanking period, the flag pulse being supplied to the gate circuit 13. The gate circuit 13 is connected to an adding circuit 16 both directly and through a delay circuit 15 providing a delay time corresponding to the frequency of the superimposition signal (for instance one microsecond). Further the gate circuit 13 is connected to another adding circuit 13 both directly and through a delay circuit 17 providing a delay time corresponding to one-half the frequency of the superimposition signal. The adding circuit 16 is connected through an inverting circuit 19 to one of two input terminals of an AND circuit 20, and the other adding circuit 18 is connected directly to the other input terminal of the AND circuit 20. The output side of the AND circuit 20 is connected to a relay drive circuit 21, whose output side is in turn connected to a deflection switching relay circuit 22.

Now, the operation of the above circuit will be described.

The aforementioned flag pulse which is generated by the ID flag circuit 14 with the vertical sync signal of the television signal used as a trigger signal is supplied to the gate circuit 13 for gating a leading portion of video signal, for instance three horizontal scanning lines thereof, where the aforementioned continuous wave at a constant frequency and of a constant amplitude within the broadcasting standards is superimposed. The gated signal is passed through the delay circuits 15 and 17 providing delay periods corresponding to the frequency of the superimposition signal, and the outputs of these delay circuits 15 and 17 are added to the original non-delayed gated signal in the respective adders 16 and 18. If the original signal is at a level of 0.5, for instance, the output level of the adding circuit 16 is 0, while the output level of the other adding circuit 18 is 1. Since the output of the adding circuit 16 is inverted by the inverting circuit 19 to 1, the AND circuit 20 provides output of level 1 in consequence, thus operating the relay drive circuit 22 to increase the level of the current flowing through the aforementioned horizontal deflection yoke 8 compared to the standard current. In this way, the aspect ratio of the image reproduction on the cathode-ray tube is increased, i.e., the horizontal dimension of the image reproduction is increased. It is to be understood that an image reproduction of an increased width can be obtained on the cathode-ray tube through the detection of the identification signal $S_I$ inserted in the video signal mentioned above and control of the level of the current flowing through the deflection yoke according to the detection output. If the frequency of the output of the gate circuit 13 differs from that of the ID signal $S_I$, the output of the AND circuit 20 remains 0, and the aspect ratio of the image reproduction thus remains standard. In order to aid ensuring the reliable operation, a noise suppressor circuit or waveform shaping circuit may be inserted after the gate circuit 13.

Figure 5:
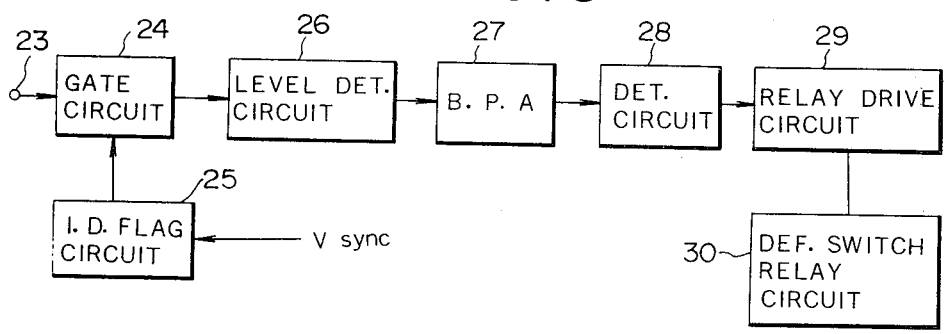
FIG. 5 is a block diagram showing another example of the identification signal detection circuit provided in a receiver according to the present invention.

FIG. 5 shows a different example of the identification signal detection circuit provided on the side of the television receiver. In the Figure, designated at 23,24 and 25 are respectively television signal input terminal, gate circuit and ID flag circuit corresponding to those 12,13 and 14 in the preceding example. The gate circuit 24 is connected through a level detection circuit 26, a band-pass amplifier circuit 27, a detecting circuit 28 and a relay drive circuit 29 in the mentioned order to a deflection amplitude switch relay circuit 30.

In this circuit, signal for only the first several horizontal scanning lines in the vertical scanning period is extracted with the vertical sync signal used as a trigger signal as mentioned previously, and then low level noise contained in the gate signal is removed through the level detecting circuit 26, the output of which is amplified through the band-pass amplifier 27 which has a narrow bandwidth. The amplified signal is coupled to the detecting circuit 28 where it is detected and integrated with a time constant corresponding to the vertical sync frequency. If the integration output is above a predetermined level, the relay drive circuit 29 drives the deflection amplitude switch relay circuit 30, whereby the current supplied to the horizontal deflection yoke is controlled for automatically controlling the aspect ratio of the image reproduction. It is possible to use a narrow band-pass filter in lieu of the aforementioned band-pass amplifier 27.

As has been described in the foregoing, according to the present invention in a television receiver, which receives a non-standard television signal containing an identification signal superimposed upon video signal for the first several horizontal scanning lines in the vertical scanning period, and AND gate is adapted to detect the aforementioned indentification signal as such if the signal has a frequency within a range sufficiently high compared to the horizontal scanning frequency and lower than and sufficiently distingushable compared to the color sub-carrier frequency and a sufficient level within a range conforming to the broadcasting standard continuously for a predetermined period in its predetermined section, and the output of the AND circuit is used to drive a deflection amplitude switch relay circuit for controlling the horizontal deflection amplitude of the image reproduction. Thus, such an identification signal can be used not only for closed systems but also for the standard television systems conforming to the broadcasting standards. Also, this signal is not affected by signals at the time of recording and reproduction with the VTR, and it can automatically conform to the wide projection so long as it is provided in a wide projection program. Further, since it has no bearing upon the audio signal, it will never interfere therewith. Still further, since the identification signal is superimposed upon the signal in the aforementioned section, it is possible to provide a sufficient signal-to-noise ratio and a long signal period, thus ensuring stable operation. Particularly, since the identification signal is inserted in the initial overscan portion of the vertical scanning period (usually 5% of the frame), it is unseen by the viewer and presents no visual problems.

What is claimed is:

1. In a variable aspect ratio television receiver comprising:
    a video signal input terminal supplied with a video signal which can be either a standard composite video signal intended to be displayed at with standard aspect ratio or a non-standard composite video signal having an identification signal and intended to be displayed with a non-standard aspect ratio;
    a video amplifier having an input connected to said video input terminal and an output providing an image output signal;
    an image reproducing apparatus supplied with the image output signal from said amplifier and displaying a video picture;
    deflecting means associated with said image reproducing apparatus and developing said video picture according to a predetermined format with a deflection height and a deflection width, such that a portion of said video signal occurs in an overscan portion beyond the deflection height of said format;
    an identification signal detecting circuit supplied with said input video signal for detecting the presence of said identification signal carried in said non-standard composite video signal; and
    a deflection width changing circuit means connected between said identification signal detecting circuit and said deflecting means for changing said deflection width developed at said deflecting means in response to said identification signal, thereby varying the aspect ratio of said video picture; the improvement in which said identification signal is carried in said non-standard composite video signal during said overscan portion of said video picture of said non-standard video signal, and said identification signal detecting circuit includes means adapted for detecting of said identification signal during said overscan period.

2. A variable aspect ratio television receiver according to claim 1, wherein said identification signal has a predetermined constant frequency and a constant amplitude.

3. A variable aspect ratio television receiver according to claim 2, wherein said standard and said non-standard composite video signals each have horizontal intervals occurring at a standard horizontal frequency and have color information carried on a chrominance sub-carrier with a predetermined chrominance sub-carrier frequency, and the frequency of said identification signal is selected to be higher than said horizontal frequency and lower than said chrominance sub-carrier frequency.

4. A variable aspect ratio television receiver according to claim 2, wherein said identification signal detecting circuit includes frequency selective means sensitive to signals of said predetermined constant frequency.

5. A variable aspect ratio television receiver according to claim 1, wherein said image reproducing apparatus comprises a cathode ray tube.

6. A variable aspect ratio television receiver according to claim 5, wherein said image reproducing apparatus further comprises a projecting lens and a projecting screen.

7. A variable aspect ratio television receiver according to claim 6, wherein said screen has an aspect ratio substantially equal to the aspect ratio of the video picture of said non-standard composite signal.

8. A variable aspect ratio television receiver according to claim 4, further comprising a gate circuit connected between said video signal input terminal and said frequency selective means, and a flag pulse generating circuit connected to said gate circuit for gating said identification signal of said non-standard composite video signal.

9. A variable aspect ratio television according to claim 8, wherein said flag pulse generating circuit is triggered by vertical sync signals in said video signal.

10. A variable aspect ratio television receiver according to claim 1, wherein said video signal includes a succession of vertical intervals demarked by vertical synch signals and each constituted by a plurality of horizontal intervals, with an initial group of each such plurality of horizontal intervals constituting said overscan position and another following group thereof constituting a picture portion, and said identification signal detecting circuit includes means triggered by said vertical synch signals to be sensitive to said identification signal only during certain one or more horizontal intervals of said initial group thereof.

* * * * *